United States Patent … Patent No.: US 6,744,254 B2
Clarey et al. … Date of Patent: Jun. 1, 2004

(54) BREAKER FAILURE ANNUNCIATOR SYSTEM

(75) Inventors: Robert J. Clarey, Mt. Lebanon, PA (US); Robert T. Elms, Monroeville, PA (US)

(73) Assignee: Eaton Corporation, Cleveland, OH (US)

(*) Notice: Subject to any disclaimer, the term of this patent is extended or adjusted under 35 U.S.C. 154(b) by 166 days.

(21) Appl. No.: 10/094,239

(22) Filed: Mar. 8, 2002

(65) Prior Publication Data
US 2003/0169548 A1 Sep. 11, 2003

(51) Int. Cl.[7] .......... G01R 31/02; H02H 3/00
(52) U.S. Cl. .......... 324/424; 361/42; 361/43; 361/49
(58) Field of Search .......... 361/42, 43, 44, 361/45, 46, 47, 48, 49, 50; 324/418, 424, 536, 542; 340/644, 638

(56) References Cited

U.S. PATENT DOCUMENTS

| | | | |
|---|---|---|---|
| 4,004,201 A | * | 1/1977 | DePuy .......... 361/96 |
| 5,224,006 A | | 6/1993 | MacKenzie et al. .......... 361/45 |
| 5,260,676 A | | 11/1993 | Patel et al. .......... 335/18 |
| 5,293,522 A | | 3/1994 | Fello et al. .......... 335/18 |
| 5,459,630 A | | 10/1995 | MacKenzie et al. .......... 361/45 |
| 5,691,869 A | | 11/1997 | Engel et al. .......... 361/42 |
| 5,729,145 A | * | 3/1998 | Blades .......... 324/536 |
| 5,982,593 A | | 11/1999 | Kimblin et al. .......... 361/42 |
| 5,982,596 A | * | 11/1999 | Spencer et al. .......... 361/64 |
| 6,040,967 A | | 3/2000 | DeiSalvo .......... 361/42 |
| 6,359,763 B1 | * | 3/2002 | Edwards .......... 361/93.1 |

\* cited by examiner

Primary Examiner—N. Le
Assistant Examiner—Vincent Q. Nguyen
(74) Attorney, Agent, or Firm—Martin J. Moran

(57) ABSTRACT

An annunciation system which will detect the majority of failed breakers and indicate to the consumer when a breaker needs to be replaced, but does not put the consumer in an emergency situation where critical loads have lost power. The annunication system provides a visible and audible indication of the failure of a breaker to trip either as a result of fault current conditions or a test of a ground fault or arc fault circuit.

7 Claims, 1 Drawing Sheet

BREAKER FAILURE ANNUNCIATOR SYSTEM

BACKGROUND OF THE INVENTION

1. Field of the Invention

This invention relates generally to circuit interrupters and, more particularly, to circuit interrupters that provide an audible and/or visual alarm when their trip mechanisms fail to actuate an operating mechanism for opening an electrical circuit in response to a fault condition.

2. Related Art

Circuit interrupters include, for example, circuit breakers, contactors, motor starters, motor controllers, other load controllers and receptacles having a trip mechanism. Circuit breakers are well known in the art and examples are disclosed in U.S. Pat. No. 5,260,676 and U.S. Pat. No. 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizeable magnetic forces generated by a short circuit or fault, also unlatches or trips the operating mechanism.

In many applications, the circuit breaker also provides ground fault protection. Typically, an electronic circuit detects leakage of current to ground and generates a ground fault trip signal. This trip signal energizes a shunt trip solenoid, which unlatches the operating mechanism, typically through actuation of a thermal-magnetic trip device.

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line to ground fault causes the magnitude of the amplified signal to exceed the magnitude of the reference values and, thus, generates a trip signal. At least the neutral conductor of the protected circuit passes through the second sensor coil. A neutral to ground fault couples the two detector coils which causes the amplifier to oscillate, thereby resulting in the generation of a trip signal. Examples of these circuits can be found in U.S. Pat. Nos. 5,260,676 and 5,293,522.

Recently, there has been considerable interest in also providing protection against arc faults. Arc faults are intimate and high impedance faults which can be caused, for instance, by worn insulation between adjacent conductors, by exposed ends between broken conductors, by faulty connections, and in other situations where conducting elements are in close proximity. Because of their intimate and high impedance nature, arc faults do not generate currents of either sufficient instantaneous magnitude or sufficient average root mean square current to trip the conventional circuit interrupter. Even so, the arcs can cause damage or start a fire if they occur near combustible material. It is not practical to simply lower the pickup currents on conventional circuit breakers, as there are many typical loads which draw similar currents and would, therefore, cause nuisance trips. Consequently, separate electrical circuits have been developed for responding to arc faults. Examples of such circuits can be found in U.S. Pat. Nos. 5,224,006 and 5,691,869.

Ground fault protection circuits and arc fault protection circuits typically include separate associated test circuits for affirming their continued operability. Separate test switches are provided for performing the ground fault and arc fault tests, for example, as described in U.S. Pat. No. 5,459,630. Alternately, a single test actuator can be employed for conducting both tests as described in U.S. Pat. No. 5,982,593.

Proposals have been put forth, as set forth in U.S. Pat. No. 6,040,967, that a "lockout" device be included in ground fault interrupter circuit breakers. This device is only activated on testing of the breaker. If a failure of the tripping circuit or the sensing circuit is detected, the breaker is forced open on testing; leaving the consumer with a power outage that cannot be corrected without an electrician. This power loss will be a disincentive to test breakers; fewer breakers will be tested; and potentially more failed breakers will remain in the field. A study has been conducted that indicated some ground fault circuit interrupter receptacles and breakers may have failed in the field and may not be providing protection and the user is not doing the required periodic testing to detect these failures (NEMA field test survey).

Accordingly, an improved circuit interrupter protection system is desired that will alert a user to a failed breaker condition without disadvantaging the user by preventing the breaker from being reset.

SUMMARY OF THE INVENTION

The foregoing objective is achieved by a breaker failure annunciation system for either or both ground fault circuit interrupters or arc fault circuit interrupters that does not depend on actions taken by a consumer in order to detect a failure in either the mechanical trip mechanism or the electrical trip circuitry. A trip mechanism within the circuit interrupter that actuates an operating mechanism in response to predetermined current conditions to open the circuit interrupter's contacts, provides an electrical output when activated. The electrical output is connected to an annunciator that supplies an alarm when the operating mechanism fails to open the contacts when actuated by the trip mechanism, to alert a user of the failed actuation.

In the preferred embodiment, the alarm is provided by a light emitting diode and/or an audible alarm. Preferably, where the interrupter includes an actuation coil in series with a fusible resister, the breaker failure annunciator system is connected in parallel with the series arrangement of the actuation coil and fusible resister.

Preferably, the annunciator is activated by the detection of a failure in either the trip mechanism, ground fault interrupter circuit or arc fault interrupter circuit and does not prevent the resetting of the circuit interrupter. In addition, in the preferred embodiment, a detection of a failure in the arc fault interruption circuit or the ground fault interruption circuit does not activate the trip mechanism.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Proposals have been made, as evidenced by U.S. Pat. No. 6,040,967, that a lockout device be included in ground fault interruption circuit breakers to remove such breakers that experience a failure in their ground fault circuitry from service. This device is only activated on testing of the breaker. If a failure of the tripping circuit or the sensing circuit is detected, the breaker cannot be closed; leaving the consumer with a power outage that cannot be corrected without an electrician. This power loss will be a disincentive to test breakers. Therefore, there is a likelihood that fewer breakers will be tested and potentially more failed breakers will remain in the field.

This invention overcomes that difficulty by providing an annunciation system which will detect the majority of failed breakers and indicate to the consumer when a breaker needs to be replaced, but does not put the consumer in an emergency situation where critical loads have lost power. This system does not depend on any actions to be taken by the consumer in order to detect a failure. The most typical failure is an open trip coil or a mechanical failure of the trip mechanism or operating mechanism which causes a fusible resister 20 in series with a trip coil 18, shown in FIG. 1, to open due to failure of the contacts 14 to open under trip conditions. Either condition, that is failure of the trip coil or opening of the fusible resister, will cause the arc fault circuit and ground fault circuit power supply to energize the failure annunciator circuit as will be appreciated hereafter. A second portion of the failure annunciator circuit 30 of this invention monitors the arc fault circuit and/or ground fault circuit. If the failure annunciator circuit 30 detects a circuit failure, it turns on its internal semiconductor controlled rectifier (SCR) 46 shown in FIG. 2, which indicates a breaker failure by lighting a light emitting diode (LED) 52 and applying power to an audible alarm. Preferably, the LED is mounted in a visible position on the breaker housing such as in the handle.

Figure 1:
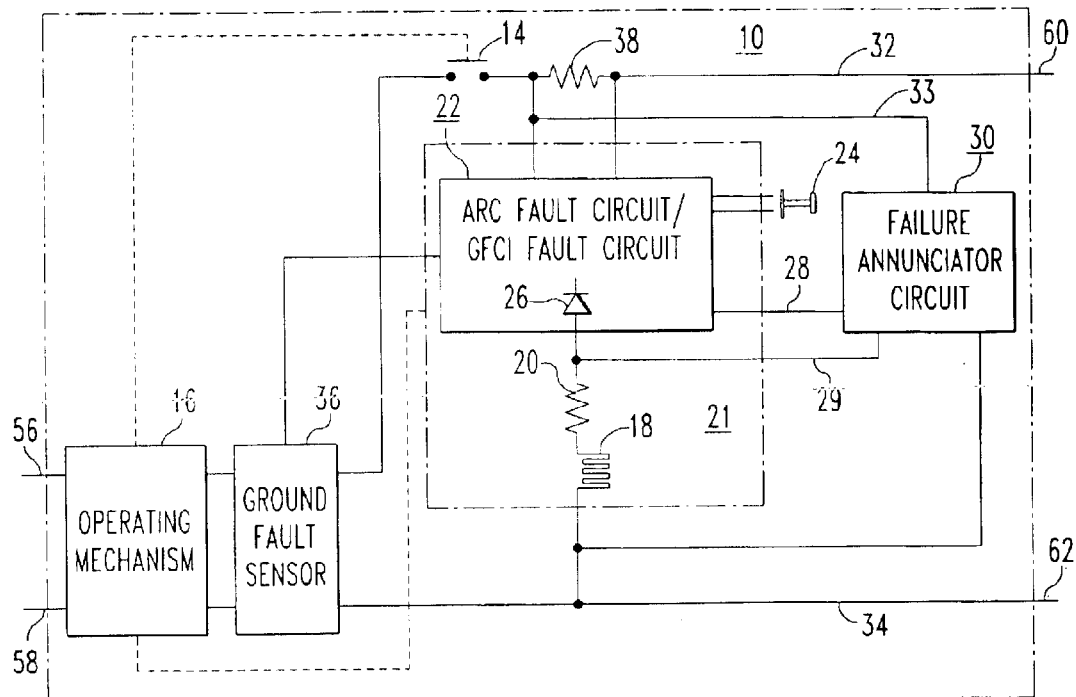
FIG. 1 is a block diagram schematic of a circuit breaker incorporating the failure annunciation system of this invention.

The invention will be described as applied to a single pole circuit breaker of the type commonly used in residential and light commercial applications. However, it should be evident to those skilled in the art that the invention is also applicable to other types of circuit interrupters as well. Referring to FIG. 1, a circuit breaker is figuratively illustrated in block form. The circuit breaker 10 includes a housing 12 which is typically assembled from a number of molded sections composed of an electrically insulating material, as is well known. Terminals 56 and 58 respectively connecting the line 32 and neutral 34 conductors are provided at one end of the housing 12 for connecting the circuit breaker 10 to a power source. A stab 60 and a pigtail 62 at the opposite end of the housing 12 connect the breaker 10 to a commercial power distribution system (not shown). A molded handle projects from the housing 12 for manually opening and closing the circuit breaker. A test button 24 typically also projects from the housing 12 for manually testing the ground fault and/or arc fault circuits.

The circuit breaker 10 also includes separable contacts 14, which are mounted in the housing 12 and connect the line conductor 32 to the load. The separable contacts 14 are opened and closed by an operating mechanism 16. In addition to being operated manually by the handle, the operating mechanism 16 can also be actuated to open the separable contacts 14 by a trip assembly 21 in response to predetermined current conditions. The trip assembly 21 typically includes a conventional bimetal (not shown), which is heated by persistent overcurrents and bends to actuate the operating mechanism 16 to open the separable contacts 14. An armature activated by a trip coil 18 in the trip assembly 21 is attracted by the large magnetic force generated by very large overcurrents to also actuate the operating mechanism 16 and provide an instantaneous trip function.

The trip assembly 21 is also provided with an arc fault detector and a ground fault detector within the circuit 22. The arc fault detector may be, for instance, of the type which detects step increases in current which occur each time an arc is struck, although other types of arc fault detectors could also be used. Suitable arc fault detectors are disclosed, for instance, in U.S. Pat. Nos. 5,224,006, and 5,691,869. The arc fault detector senses the current in the electrical system by monitoring the voltage across a resistor 38 to sense an arc fault current condition. As described in U.S. Pat. No. 5,691,869, the arc fault detector includes circuitry, which generates a pulse in response to each step change in current. The pulse signal is integrated with the result of the integration being attenuated over time. When the time attenuation accumulation of the pulses reaches a selected level, the arc fault detector generates, at its output; an arc fault trip signal through the biasing of the silicon controlled rectifier 26 to provide a fault trip signal to the trip coil 18. The trip coil 18, for instance, can activate the armature of a solenoid to change the state of an overcenter toggle mechanism in the operating mechanism 16, to open the contacts 14.

The ground fault detector within the circuit 22 may be of the well-known dormant oscillator type in which case it utilizes a pair of sensing coils 36 to detect both line-to-ground and neutral-to-ground fault current conditions. If the arc fault detector detects an arc fault the detector circuit supplies an electrical signal that biases the silicon controlled rectifier 26, shown in FIG. 1, to conduct which generates a trip signal in a manner similar to that explained for the arc fault detector. The ground fault trip signal is "Ored" with the arc fault signal such that the combination of the two signals form a fault protection trip signal that is communicated through the series combination of the fusible resister 20 and trip coil 18. In this manner, either an arc fault condition or a ground fault condition results in the interruption of electrical power, independent of the other.

As explained in U.S. Pat. No. 5,982,593, both the arc fault detector and ground fault detector have test circuits. The ground fault test circuit and the arc fault test circuit are sequentially enabled by a test controller in response to the test push button 24 for testing the ground fault detector and the arc fault detector, respectively. In the course of a test, if the ground fault detector and the arc fault detector are operating properly, they generate trip signals when the associated test circuits, respectively, are enabled.

The ground fault test circuit, when enabled by the test controller, generates a test signal to the ground fault detector circuit to simulate a ground fault current condition by mimicking ground faults in the electrical system and, thereby, testing operation of the ground fault detector. The arc fault test circuit, when enabled by the test controller, provides signals to the arc fault detector to simulate an arc fault current condition by mimicking arc faults in the electrical system and, thereby, testing operation of the arc fault detector. The test circuit preferably includes a low frequency relaxation oscillator and a coupling circuit for coupling a pulse signal generated by the relaxation oscillator to the arc fault detector. If a trip signal is not generated that would normally bias the silicon controlled rectifier 26 to conduct, then a failed detection signal 28 is communicated to the failure annunciator circuit 30 to announce that either the arc fault circuit or the ground fault circuit had failed. Similarly, if the silicon-controlled rectifier 26 is biased to conduct to provide a trip signal to the trip coil 18, the trip signal is also conducted through the electrical connection 29 to the failure annunciator 30. If an overcurrent condition exists that fails to activate the operating mechanism 16 to open the contacts 14, either because the trip coil 18 is open circuited or because of any other electrical or mechanical defect in the operating mechanism, the fusible resister 20 will open, resulting in a sustained trip signal being supplied via conductor 29 to the failure annunciator circuit 30 announcing the failure to the circuit user.

Figure 2:
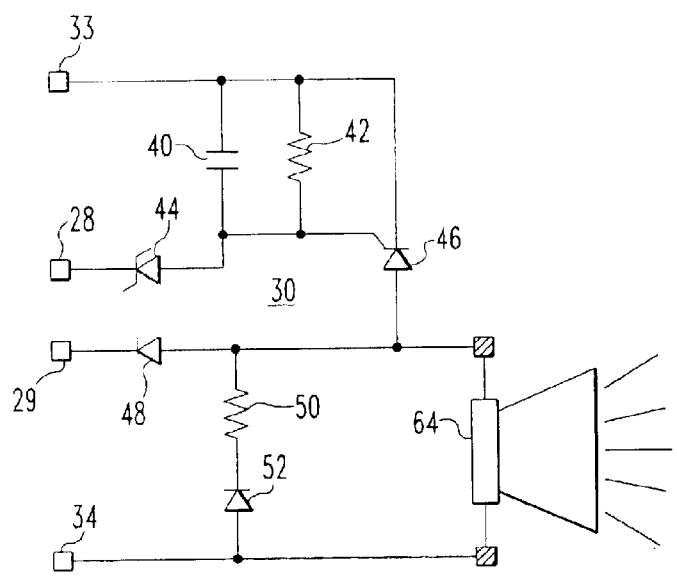
FIG. 2 is a circuit schematic of the failure annunciator circuit identified in block form in FIG. 1.

The failure annunciator circuit 30 is shown in more detail in FIG. 2. The circuit 30 is connected between line 33 and neutral 34. If a failed detection signal appears at 28 due to the failure of the arc fault circuit or the ground fault circuit to detect a test signal, the failed detection signal appearing at 28 breaks down a 30 volt zener diode 44 which biases the silicon controlled rectifier 46 across a parallel arrangement of a 0.1 microfared capacitor 40 and 10,000 ohm resister 42, which causes the silicon controlled rectifier 46 to conduct electrical current through a series arrangement of a 10,000 ohm, 1 watt resister 50 and a light emitting diode 52 in parallel with an optional audible alarm 64. Preferably, the light emitting diode is red and the alarm 64 can be a buzzer. As will be appreciated by those skilled in the art, the circuit values identified above are illustrative and many other combinations of circuit values can be employed to achieve the same objective.

Preferably, the failed detection signal appearing at conductor 28 is latched to maintain an active LED output until the circuit is reset. The diode 48 prevents the LED actuation signal from being communicated to the series combination of the fusible resister 20 and trip coil 18 so that the trip circuit is not actuated as a result of a failure of a test of the arc fault or ground fault circuits. Additionally, other trip signals communicated to the series combination of the fusible resister 20 and trip coil 18 will be communicated through the diode 48 to activate the LED 52 and optional audible alarm 64.

Accordingly, this invention provides an annunciation system which will detect the majority of failed breakers, and indicate to the consumer when a breaker needs to be replaced, but does not put the consumer in an emergency situation where critical loads have lost power. Accordingly, the system of this invention does not depend on any actions to be taken by the consumer in order to detect a failure.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A circuit interrupter comprising:

a housing;

separable contacts mounted in said housing;

an operating mechanism for opening said separable contacts when actuated;

trip means for actuating said operating mechanism in response to predetermined current conditions, said trip means having an electrical output when activated;

an annunciator connected to said output from said trip means and providing an alarm when said operating mechanism fails to open said separable contacts when actuated by said trip means, to alert a user of the failed actuation; and wherein said trip means includes an actuation coil in series with a fusible resistor and said annunciator is connected in parallel with the series arrangement of said actuation coil and said fusible resistor.

2. A circuit interrupter comprising:

a housing;

separable contacts mounted in said housing;

an operating mechanism for opening said separable contacts when actuated;

trip means for actuating said operating mechanism in response to predetermined current conditions, said trip means having an electrical output when activated;

an annunciator connected to said output from said trip means and providing an alarm when said operating mechanism fails to open said separable contacts when actuated by said trip means, to alert a user of the failed actuation;

wherein said trip means includes an arc fault detection circuit responsive to the occurrence of an arc fault to provide the electrical output to the annunciator; and including a monitoring circuit for monitoring the operation of the arc fault detection circuit and responsive to an error in the operation of the arc fault detection circuit to provide a second output that energizes said alarm.

3. The circuit interrupter of claim 2 wherein the second output does not activate the trip means.

4. The circuit interrupter of claim 2 wherein the monitoring circuit monitors the operation of the arc fault detection circuit periodically.

5. The circuit interrupter of claim 4 wherein the monitoring circuit is a test circuit.

6. The circuit interrupter of claim 4 wherein the monitoring circuit monitors the operation of the fault detection circuit automatically.

7. The circuit interrupter of claim 6 wherein the period between monitoring operations is controlled by the user.

* * * * *